United States Patent [19]

Kawahara et al.

[11] Patent Number: 4,992,653
[45] Date of Patent: Feb. 12, 1991

[54] LINEAR IMAGE SENSOR

[75] Inventors: Yukito Kawahara; Satoshi Machida; Hiroshi Mukainakano, all of Tokyo, Japan

[73] Assignee: Seiko Instruments Inc., Japan

[21] Appl. No.: 510,158

[22] Filed: Apr. 16, 1990

[30] Foreign Application Priority Data

Apr. 17, 1989 [JP] Japan .................................. 1-96791

[51] Int. Cl.$^5$ ............................................. H01J 40/14
[52] U.S. Cl. .............................. 250/208.1; 358/213.29
[58] Field of Search ................... 250/208.1; 357/30 H; 358/213.11, 213.29

[56] References Cited

U.S. PATENT DOCUMENTS 4,546,243  10/1985  Hamano et al. .................. 250/208.1
4,857,751   8/1989  Hatanaka et al. ................ 250/208.1

Primary Examiner—David C. Nelms
Assistant Examiner—Khaled Shami
Attorney, Agent, or Firm—Bruce L. Adams; Van C. Wilks

[57] ABSTRACT

The image sensor of the linear type includes a plurality of photoelectric conversion elements, switching elements each having an input terminal connected to each photoelectric conversion element and an output terminal for reading out a detection signal produced from the corresponding photoelectric conversion element, and a scanning circuit for sequentially driving the switching elements. A first common line is connected to output terminals of odd-numbered switching elements. A second common line is connected to output terminals of even-numbered switching elements. A first reading gate has an output terminal and an input terminal connected to the first common line. A first reset gate has an output terminal and an input terminal connected to the first common line. A second reading gate has an output terminal and an input terminal connected to the second common line. A second reset gate has an output terminal and an input terminal connected to the second common line. A third common connecting line is connected between the output terminals of first and second reading gates and a signal output terminal for outputting the detection signals. A reset power source terminal is connected to the output terminals of the first and second reset gates. A control circuit operates with the sequential driving of the switching elements for controlling the first and second reading gates and the first and second reset gates so as to output the detection signals while sequentially resetting the photoelectric conversion elements.

2 Claims, 3 Drawing Sheets 4,992,653

LINEAR IMAGE SENSOR

BACKGROUND OF THE INVENTION

The present invention relates to a linear image sensor suitable for an image scanner to effect reading of image, used in a facsimile machine for transmitting image information and in a desk-top-publishing machine.

Recently, there have been marketed various types of information processing instruments such as facsimile machine for transmitting image information and desk-top-publishing machine for editing image. In order to expand market for consumer use, it is necessary to reduce cost of the image sensor used in these instruments.

As shown in FIG. 3, the known image sensor in the prior art is comprised of a plurality of photoelectric conversion elements $S_n$, $S_{n+1}$—for converting image information into electric signals switching elements $SW_n$, $SW_{n+1}$—for feeding outside the electric signals obtained from the respective photoelectric conversion elements, reset gate elements $RG_n$, $RG_{n+1}$—each coupled to the corresponding photoelecric conversion element for resetting the same to the initial state after feeding out the electric signal representative of image information, and a scanning circuit composed of flipflops $FF_n$, $FF_{n+1}$— for sequentially driving these switching elements and the reset gate elements.

As noted above, the demand for cost reduction increases while image information processing instruments have been widely spread. Especially, it is most necessary to reduce the cost of image sensor which constitutes the image information input unit of these instruments.

SUMMARY OF THE INVENTION

Accordingly, an object of the present invention is to provide a linear image sensor at low cost for use in a facsimile machine and an image scanner as image information input device.

In order to solve the problem of the prior art, according to the present invention, the circuit is constructed for resetting the respective photoelectric conversion elements to the initial state such that odd-numbered photoelectric elements are reset commonly by one reset gate circuit through the corresponding switching elements and a common signal line, and likewise even-numbered photoelectric elements are reset commonly by another reset gate circuit in contrast to the prior art in which the respective photoelectric conversion element is individually reset by the corresponding reset gate element. Further, the scanning circuit is constructed for controlling each switching element such that an output signal of each bit of a shift register can be directly used as a control signal for each switching element. For this, output terminals of the odd-numbered switching elements and the even-numbered switching elements are separated from each other, and the two divided groups are connected to the respective common signal lines so as to alternatively feed out the electric signals on the two common signal lines.

The conventional reset gate elements provided for the corresponding photoelectric conversion elements in the prior art can be replaced by a pair of reset gate circuits in the present invention. Further in the scanning circuit, the output signal of each bit of the shift registers can be directly used as a control signal for controlling each switching element.

DETAILED DESCRIPTION OF EMBODIMENT

Figure 1:
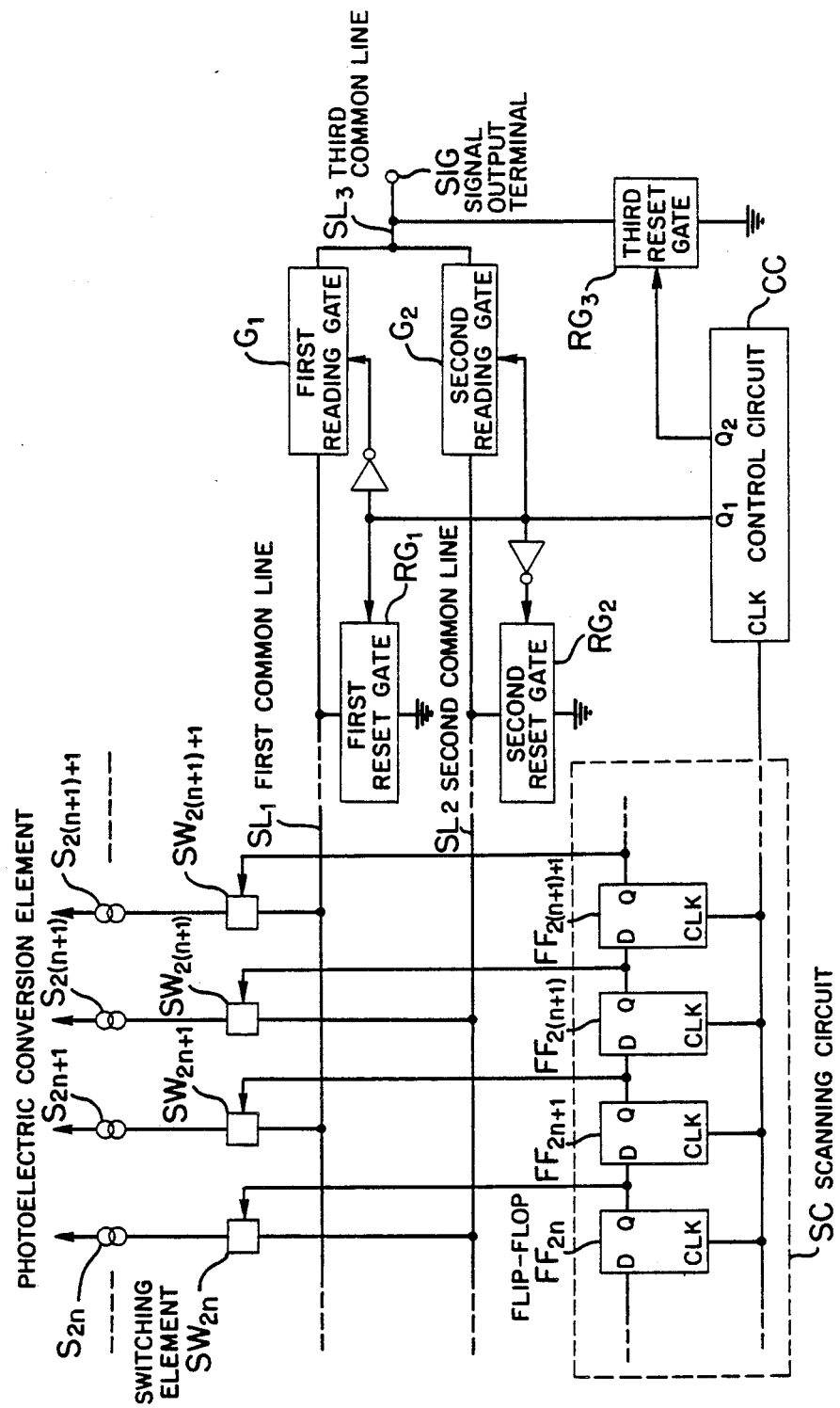
FIG. 1 is a schematic diagram of the image sensor circuit according to the present invention.

Hereinafter, the present invention is described in detail with reference to one embodiment shown in the drawings. FIG. 1 is a schematic diagram of an image sensor circuit in the embodiment according to the present invention. An output terminal of each of photoelectric conversion elements $S_{2n}$, $S_{2n+1}$—is connected to an input terminal of each of corresponding switching elements $SW_{2n}$, $SW_{2n+1}$—. An output terminal of each of the odd-numbered switching elements $SW_{2n+1}$, $SW_{2n+3}$—is connected to a first common connecting line $SL_1$, while another output terminal of each of the even-numbered switching elements $SW_{2n}$, $SW_{2n+2}$—is connected to a second common connecting line $SL_2$. The first common connecting line or signal line $SL_1$ is connected to an input terminal of a first reading gate circuit $G_1$ and to an input terminal of a first reset gate circuit $RG_1$, while the second common connecting line or signal line $SL_2$ is connected to an input terminal of a second reading gate circuit $G_2$ and to an input terminal of a second reset gate circuit $RG_2$. Output terminals of the first and second reading gate circuits $G_1$ and $G_2$ are directly coupled to each other and are connected commonly to a third common connecting line $SL_3$. The third common connecting line $SL_3$ is connected between a signal output terminal SIG to the outside and an input terminal of a third reset gate circuit $RG_3$. Respective output terminals of the first, second and third reset gate circuits $RG_1$, $RG_2$ and $RG_3$ are connected to a reset power source in the form of the ground GND in this circuit which supplies a reset potential. Control signals are obtained or fed from an output terminal Q of each stage or bit of flipflops $FF_{2n}$, $FF_{2n+1}$—which constitute a shift register of a scanning circuit SC. Namely, the output terminal Q of the n-th stage flipflop $FF_n$ is connected to a control terminal of the n-th swithing element $SW_n$. Further, a control circuit CC is provided for controlling the various circuits and has a clock terminal CLK, a first output terminal $Q_1$ connected directly to control terminals of the first reset gate circuit $RG_1$ and the second reading gate circuit $G_2$, and connected through an inverter to control terminals of the first reading gate circuit $G_1$ and the second reset gate circuit $RG_2$, and a second output terminal $Q_2$ connected to a control terminal of the third reset gate circuit $RG_3$.

Figure 2:
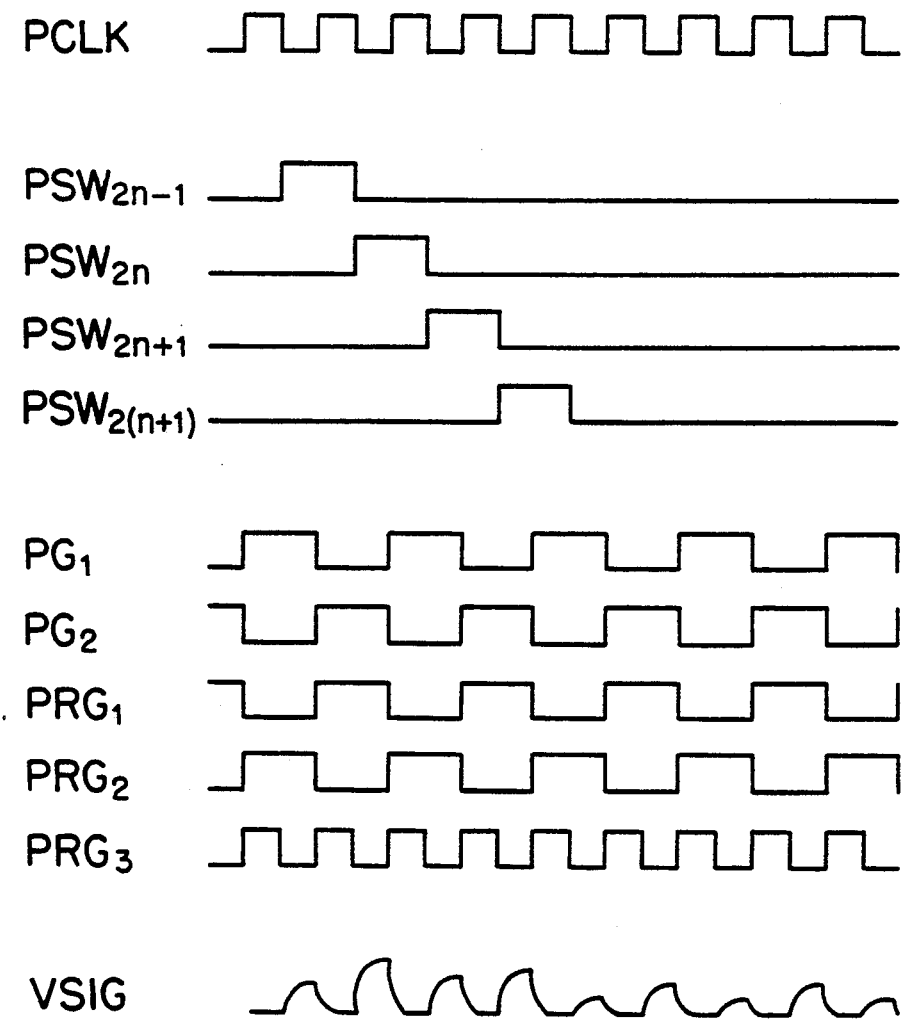
FIG. 2 is a timechart of control signals for the inventive circuit.
Figure 3:
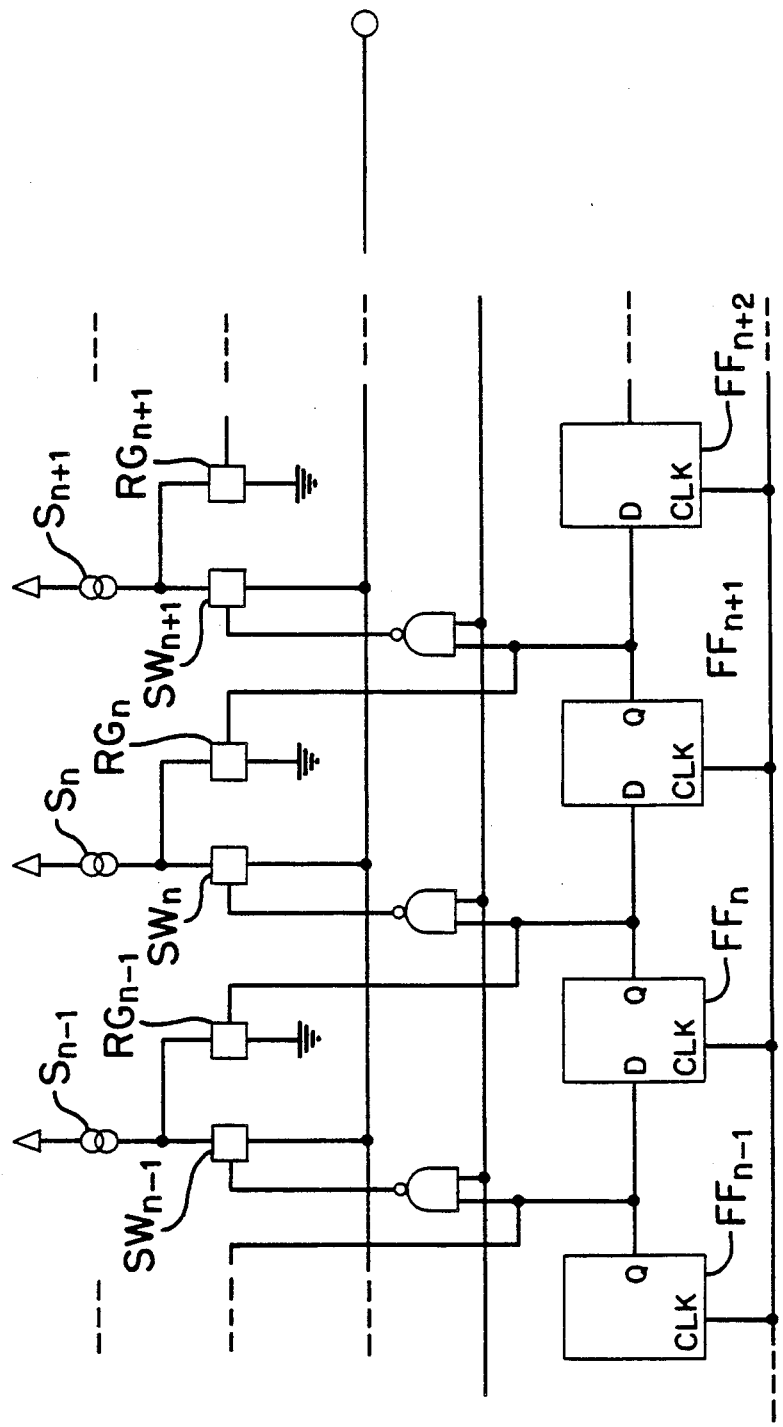
FIG. 3 is a circuit diagram of the conventional image sensor.

The operation of the above described circuit is described in conjunction with a timechart of FIG. 2. In the figure, a waveform PCLK indicates a clock pulse train which is inputted into the flipflops $FF_{2n}$, $FF_{2n+1}$—and into the clock terminal CLK of the control circuit CC. A waveform $PSW_i$ (i=2n, 2n+1—) indicates a control pulse signal effective to control the i-th switching element, a waveform $PG_j$ (j=1, 2) indicates a control signal effective to control the j-th reading gate circuit $G_j$ and fed at its control terminal, and a waveform $PRG_K$ (k=1, 2, 3) indicates a control signal effective to control the k-th reset gate circuit $RG_k$ and fed at its control terminal These control signals $PSW_i$, $PG_j$ and $PRG_k$ are effective at their high level to turn on the switching element $SW_i$, reading gate circuit $G_j$ and reset gate circuit $RG_k$, respectively, to hold conductive state between their input and output terminal, and are effective at their low level to turn off these elements and circuits to hold nonconductive state. Therefore the pair of reading gate circuits $G_1$ and $G_2$ are alternatively made conductive and nonconductive in opposite phase relation to each other. Further, the first reading gate circuit $G_1$ and the first reset gate circuit $RG_1$ are alternatively made conductive and nonconductive in opposite phase relation to each other. In similar manner, the second reading gate circuit $G_2$ and the second reset gate circuit $RG_2$ are alternatively turned on and off in opposite relation to each other. The third reset gate circuit $RG_3$ switches between the conductive and nonconductive states generally in synchronization with the clock pulse signal PCLK The switching element $SW_i$, reading gate circuit $G_j$ and reset gate circuit $RG_k$ are held in their conductive states each time for a duration corresponding to one period of the clock pulse signal PCLK. With regard to their switching timing between the conductive and nonconductive states, the switching element $SW_i$ effects the switching or the transition of the states in response to a trailing edge timing of the clock pulse signal PCLK, and the reading gate circuit $G_j$ and reset gate circuit $PG_k$ effect their switching or transition in response to a leading edge timing of the clock pulse signal.

Next, the description is given for sequentially reading out detection signals obtained by the plural photoelectric conversion elements $S_l$ ($l=2n, 2n+1$—). Firstly, the scanning circuit SC is inputted with a train of binary bit data (100 ... 0) having a bit number greater than that of the shift register composed of the flipflops $FF_{2n}$, $FF_{2n+1}$—in synchronization with the clock pulse signal so that the train of binary bit data is shifted through the shift register to produce a control or scanning signal effective to sequentially turn on the plural switching elements $SW_i$. Then, for example, a detection signal produced by the odd-numbered photoelectric conversion element $S_{2n+1}$ of $(2n+1)$-th one is read out to the first common connecting line $SL_1$. Namely, after the first reading gate circuit $G_1$ is turned on in response to a leading edge of the clock pulse signal PCLK, the $(2n+1)$-th switching element $SW_{2n+1}$ is turned on in response to the following trailing edge of the clock pulse signal to feed the corresponding detection signal to the first common connecting line $SL_1$. At this time, since the second reading gate circuit $G_2$, first reset gate circuit $RG_1$, and third reset gate circuit $RG_3$ are turned off, the photoelectric detection signal is read out from the $(2n+1)$-th photoelectric conversion element $S_{2n+1}$ through the switching element $SW_{2n+1}$, the first common connecting line $SL_1$, the first reading gate circuit $G_1$ and the third common connecting line $SL_3$ to the signal output terminal SIG. Thereafter, the first reading gate circuit $G_1$ is turned off in response to the next leading edge of the clock pulse signal PCLK. Concurrently, the second gate circuit $G_2$ and the first reset gate circuit $RG_1$ are turned on, and the third reset gate circuit $RG_3$ is also held in the conductive state. At this time, since the $(2n+1)$-th switching element $SW_{2n+1}$ still held in the conductive state, the $(2n+1)$-th photoelectric conversion element $S_{2n+1}$ is connected to the reset potential sourse by the first reset gate circuit $RG_1$ and is accordingly reset thereby through the switching element $SW_{2n+1}$ and the first common connecting line $SL_1$. Further at this time, since the next $(2n+2)$-th switching element is yet held in the nonconductive state, the next detection signal is not yet fed to the second common connecting line $SL_2$ from the next even-numbered $(2n+2)$-th photoelectric conversion element $S_{2n+2}$. Accordingly, the signal output terminal SIG is held at the reset potential, since the third reset gate circuit $RG_3$ is held in the conductive state.

Then, when the following trailing edge occurs in the clock pulse signal PCLK, the $(2n+1)$-th switching element $SW_{2n+1}$ is changed to the nonconductive state so that the corresponding photoelectric conversion element is released from the reset state and initiates photoelectric conversion to store electric charge. On the other hand, the succeeding $(2n+2)$-th switching element $SW_{2n+2}$ is turned on and the third reset gate circuit $RG_3$ is changed to the nonconductive state immediately before the turning-on of the switching element $SW_{2n+2}$. Therefore, the detection signal obtained in the $(2n+2)$-th photoelectric conversion element $S_{2n+2}$ is fed out to the signal output terminal SIG through the corresponding switching element $SW_{2n+2}$, the second common connecting line $SL_2$, the second reading gate circuit $G_2$ and the third common connecting line $SL_3$. By repeatedly carrying out the above described sequence, the detection signals can be successively read out from the plural photoelectric conversion elements.

Importantly, when each switching element is switched from the nonconductive state to the conductive state so as to read out the detection signal, the reading gate circuit $G_1$ or $G_2$ is held in the stable state. Therefore, switching noise of the reading gate circuit would not be superposed on the photoelectric detection signal to thereby avoid reduction of S/N ratio. The linear image sensor is operated as described above.

According to the present invention, the number of components of the reset circuit can be reduced for use in resetting of each photoelectric conversion element, and a number of components can be also reduced in the scanning circuit, thereby reducing the size of the image sensor chip. Generally, the number m of the photoelectric conversion elements is comparable to the stage number of the shift register in the scanning circuit, and the number m ranges from several tens to several thousands. Therefore, huge number of components can be eliminated effectively according to the present invention. While simplifying the structure of the scanning circuit, leakage of photoelectric charge can be avoided between the adjacent photoelectric conversion elements. Moreover, switching noise is not caused when switching the gate circuits between the odd-numbered and even-numbered photoelectric conversion elements, thereby obtaining image signal of good quality. Further, by reducing the size of chip, the image sensor can be produced at low cost.

What is claimed is:

1. In an image sensor of the linear type having a plurality of photoelectric conversion elements arranged linearly on a semiconductor substrate for detecting image information, switching elements each having an input terminal connected to each photoelectric conversion element and an output terminal for reading out a detection signal produced from the corresponding photoelectric conversion element, and a scanning circuit for sequentially driving the switching elements through their control terminals, the improvement comprising: first common connecting means for connecting output terminals of odd-numbered switching elements to each other; second common connecting means for connecting output terminals of even-numbered switching elements to each other; first reading gate means having an output terminal and an input terminal connected to the first common connecting means; first reset gate means having an output terminal and an input terminal connected to the first common connecting means; second reading gate means having an output terminal and an input terminal connected to the second common connecting means; second reset gate means having an output terminal and an input terminal connected to the second common connecting means; third common connecting means for connecting the output terminals of the first and second reading gate means to each other; a signal output terminal connected to the third common connecting means for outputting externally the detection signals; a reset power source terminal connected to the output terminals of the first and second reset gate means; and control means operative in synchronization with the sequential driving of the switching elements for controlling the first and second reading gate means and the first and second reset gate means so as to output sequentially through the signal output terminal the detection signals from the plurality of the photoelectric conversion elements while sequentially resetting the photoelectric conversion elements.

2. An image sensor according to claim 1; including third reset gate means having an input terminal connected to the third common connecting means and an output terminal connected to the reset power source terminal, and being operable by the control means for intermittently resetting the signal output terminal through the third common connecting means in synchronization with the sequential outputting of the detection signal at the signal output terminal.

* * * * *